April 7, 1970 L. A. TURZILLO 3,504,497
METHOD OF PRODUCING CAST-IN-PLACE PILES OR
LIKE BODIES IN A SITUS
Filed July 27, 1966 3 Sheets-Sheet 1
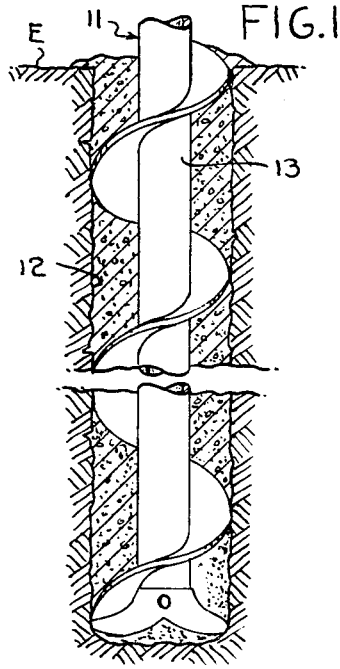
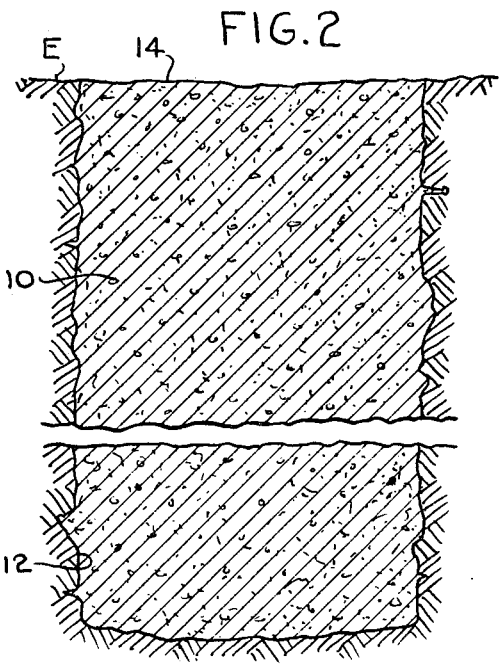
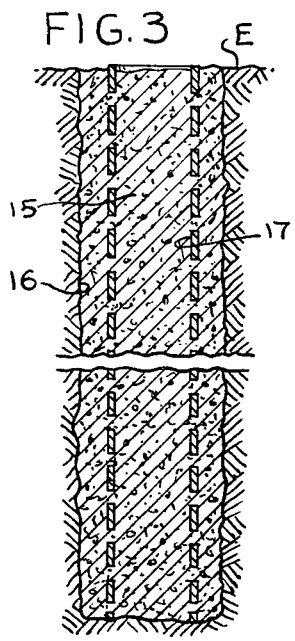
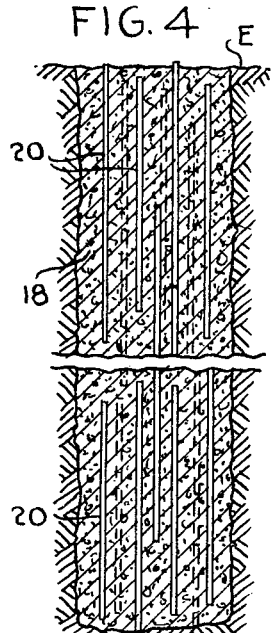
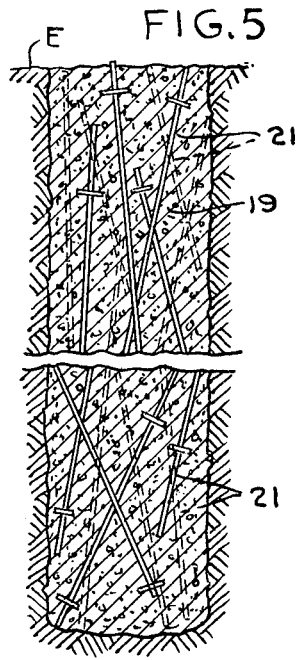
INVENTOR.
Lee A. Turzillo
BY William Cleland
Attorney April 7, 1970   L. A. TURZILLO   3,504,497
METHOD OF PRODUCING CAST-IN-PLACE PILES OR
LIKE BODIES IN A SITUS
Filed July 27, 1966   3 Sheets-Sheet 2
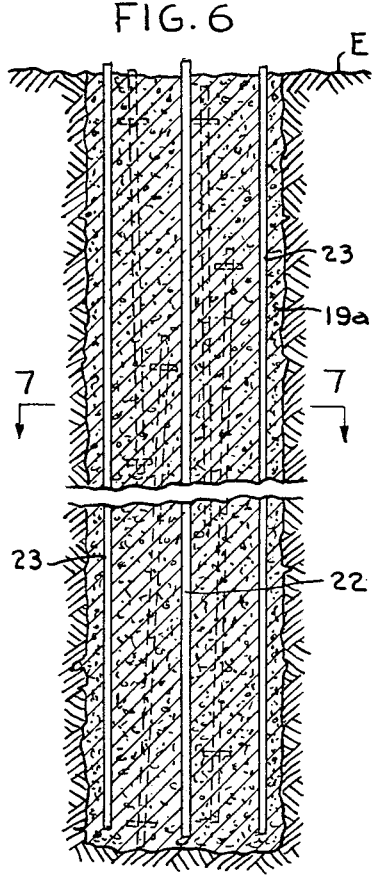
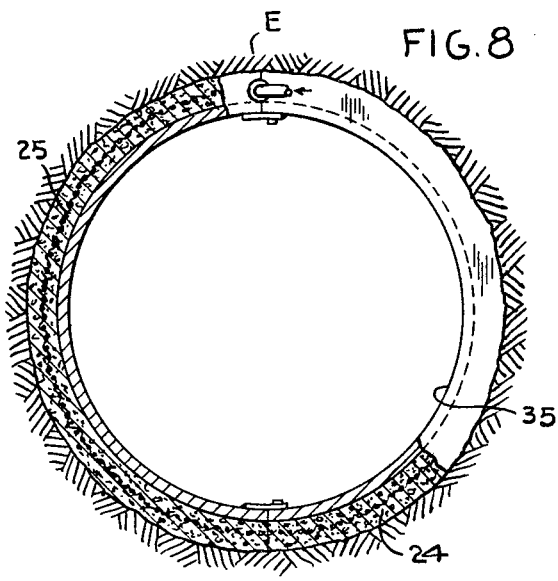
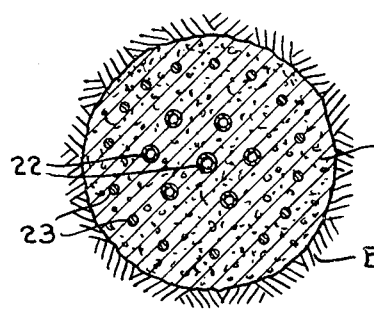
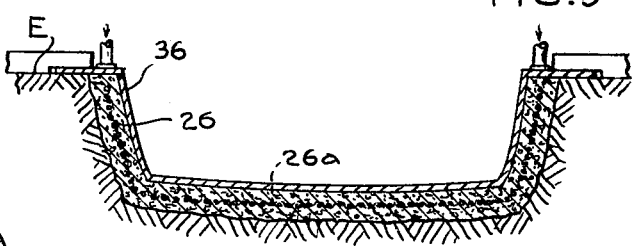
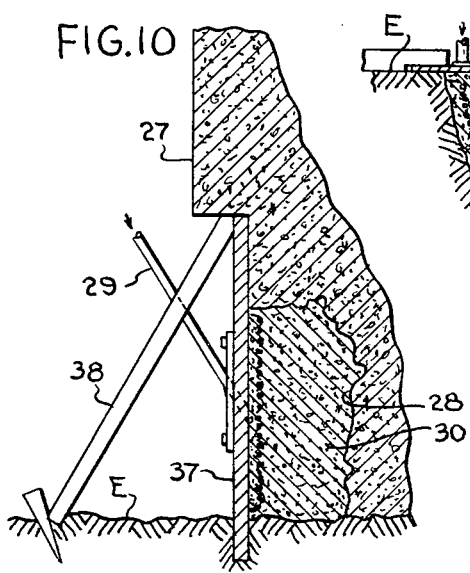
INVENTOR.
Lee A. Turzillo
BY William Cleland
Attorney

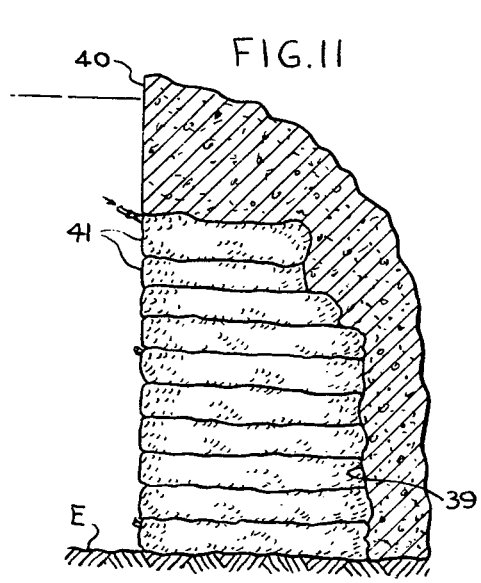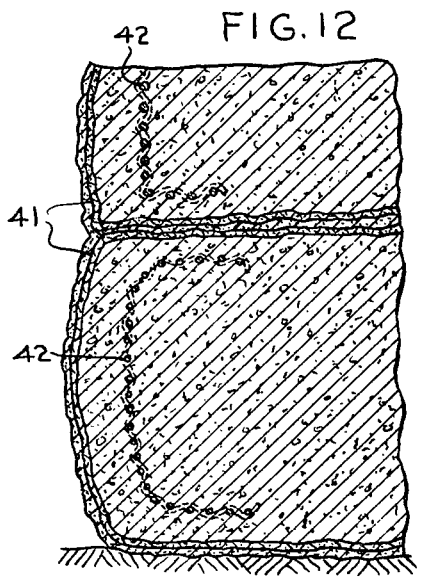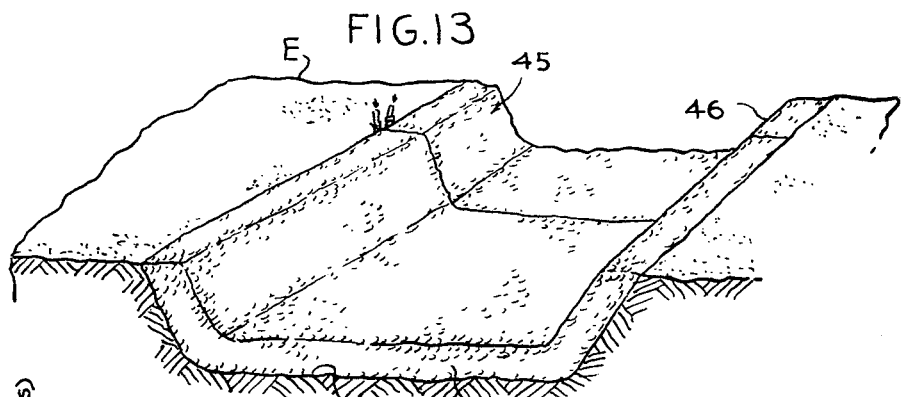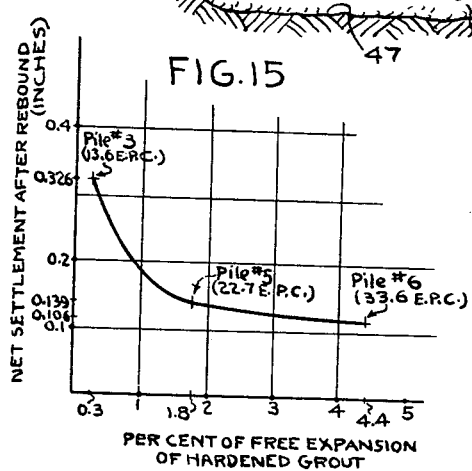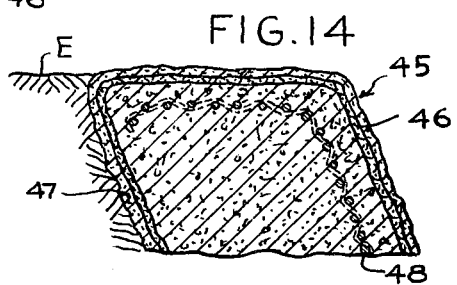

United States Patent Office 3,504,497
Patented Apr. 7, 1970

3,504,497
METHOD OF PRODUCING CAST-IN-PLACE PILES OR LIKE BODIES IN A SITUS
Lee A. Turzillo, 2078 Glengary Road,
Bath, Ohio 44210
Filed July 27, 1966, Ser. No. 568,156
Int. Cl. E02d 5/36, 5/38; E04b 1/16
U.S. Cl. 61—35         12 Claims

ABSTRACT OF THE DISCLOSURE

Cast-in-place concrete body formed by pumping hydraulic cement mortar under pressure into a natural or artificial cavity at situs, the mortar having incorporated therein after-setting expansion producing constituents capable of volumetric expansion to maximum potential after and beyond the point of final setting of mortar. Rod means, wire mesh, or other restraining mechanisms located in cast-in-place body to control both amount in directions of forces created by hydration of after-setting expansion producing constituent.

This invention relates generally to construction of cast-in-place concrete piles or similar bodies in situ, and in particular relates to an improved method of producing a cast-in-place concrete body by utilizing the walls of a cavity in the situs as a matrix for forming the concrete body.

BACKGROUND OF INVENTION

Heretofore, concrete piles, for example, have been formed as by drilling a hole in an earth situs and filling the hole with hydraulic cement grout in various ways. Generally, the grout body set or gelled in a matter of several hours, and became significantly hardened after a longer period of time, such as from five to seven days. Even under the best of conditions, however, only a relatively small degree of internal expansion was possible prior to the setting or gelling period.

Louis S. Wertz's U.S. Patent No. 2,655,004 discloses that use of a gas-producing aluminum powder "preferably .005% to .02% based on the weight of cement plus filler," only "tends to produce a slight expansion of the cement paste while it is still in the plastic state" (that is, before the phenomenon termed "initial set" takes place) "thus neutralizing the highly undesirable effect of setting shrinkage that would otherwise take place." In the present method, however, it is essential that substantially all aluminum powder at these relatively low dosages be consumed in production of gas. Otherwise, if substantial dosages are used, or the major portion of the low dosage is consumed after initial set, serious cracking may occur in the yet green concrete. Another serious drawback in the use of aluminum powder for producing expansion is that in the presence of restraint and build-up of pressure, by virtue of Henry's law, any gas generated is forced into solution in a liquid phase proportional to the pressure in atmosphere, or the reaction of aluminum powder to produce hydrogen gas is either inhibited or seriously limited. As a consequence aluminum powder, either prior to setting or at any time during the hardening period, is neither useful nor adequate to produce internal expansions of such nature and magnitude as to result in any significant improvement in either strength, skin friction, or load-bearing capacity of the pile.

SUMMARY OF INVENTION

This invention relates to a method for making cast-in-place concrete bodies in natural or artificial cavities in situ. The method, generally, includes confining within a said cavity, in opposition to restraining walls thereof, a quantity of fluid grout mixture containing an after-setting, expansion-producing constituent capable of developing predetermined substantial, volumentric expansion after the grout mixture sets and hardens, countered substantially by restraint in traverse directions. The fluid grout mixture is allowed to set and harden as a unitary body including portions thereof conforming to said wall area. The expansive-cement grout mixture effects a volumetric expansive growth of the resultant grout body after it has so set, and continues hardening and strength gain, with a corresponding increase in normal pressure and frictional resistance applied by the expanded, ultimately hardened body against said wall area, as well as with a setting up of generally compressive stresses throughout the hardened grout body in diverse directions. Included in method may be the steps of suspending a restraining mechanism within the fluid grout to become embedded in the body upon said setting of the fluid grout mixture. The restraining mechanism, during subsequent hardening of the body, serves to direct expansion-developed forces created by said after-setting expansion-producing constituent, in opposition to said wall area.

An object of the present invention is to provide an improved method for making cast-in-place piles or like concrete bodies, wherein distributed volumetric internal growth takes place in said cast-in-place bodies by expansion subsequent to the final set of the grout so that the substantially fully hardened body subsequently will have a greatly improved load-bearing capacity compared with that accomplished in practice heretofore.

Another object of the present invention is to provide an improved method of the character described in which expansion of the concrete body during normal strength development is effective to provide a greatly improved bond between the concrete body and the wall of the situs, including irregularities, such as voids, crevices, pores and the like, in the wall surfaces.

Another object of the invention is to provide an improved method of the character described by which is considerably enhanced the skin friction over the unit length of a given concrete body, by increase in the coefficient of friction through development of considerable normal force relative to the cavity wall or walls of the body, depending upon the cross-section of the cavity as a restraining mechanism, and upon the magnitude of the forces developed in the concrete.

Still another object of the invention is to provide an improved method as characterized in the preceding objects, by which reinforcing means may be utilized as an additional restraining mechanism in a cast-in-place pile or like body to control the magnitudes of force developed through the aforesaid expansive growth of the body particularly in the direction radially into tight load-bearing contact with particular wall areas of the situs.

These and other objects of the invention will be manifest from the following brief description and the accompanying drawings.

Of the accompanying drawings:

FIGURE 1 is a vertical cross-section in an earth situs, through a cavity being auger-drilled therein as a preliminary step in the method.

FIGURE 2 is an enlarged cross-section through said augered cavity but illustrating the concrete pile formed and hardened therein.

FIGURE 3 is a vertical cross-section on the same scale as FIGURE 1 but corresponding to FIGURE 2, and illustrating a casing-reinforced pile formed by the stressing method of the invention.

FIGURES 4 and 5 are views corresponding to FIGURE 3, but illustrating utilization of the improved method to form cast-in-place piles with reinforcing bars to be stressed therein by the method of the invention.

FIGURE 6 is a view corresponding to FIGURE 4, illustrating utilization of a reinforcing means utilized for supplying fluid grout in the method.

FIGURE 7 is an enlarged horizontal cross-section taken substantially on the line 7—7 of FIGURE 6.

FIGURE 8 is a vertical cross-section through a stressed concrete tunnel lining formed in an earth situs by the method of the invention.

FIGURE 9 is a view corresponding to FIGURE 8, but illustrating formation of a stressed water canal in a situs by the method of the invention.

FIGURE 10 is a vertical cross-section through a damaged concrete wall extending into an earth situs, illustrating an application of the method for repairing a cavity in the wall.

FIGURE 11 shows another example of utilizing the improved method of expanding concrete during hardening thereof, but in porous bags which have been successively positioned and expanded in a cavity or void to repair or to reinforce a concrete structure similar to that shown in FIGURE 10.

FIGURE 12 is an enlarged fragmentary cross-section of the lower left-hand portion of FIGURE 11.

FIGURE 13 is a perspective view, partly broken away and in cross-section, illustrating another use of making stressed canal lining in situ.

FIGURE 14 is an enlarged fragmentary cross-section of a portion of FIGURE 13.

FIGURE 15 is a graph showing relationship between net settlement after rebound and percentage of free expansion of hardened grout, and which was plotted from figures obtained by casting test piles in accordance with the present invention.

Referring particularly to FIGURE 1, for providing a cast-in-place concrete pile 10 in an earth situs E, as shown in FIGURE 2, a sectional auger-type drill 11 may be screwed into the earth to provide a cavity 12 of predetermined depth. Thereafter, while progressively withdrawing the drill and simultaneously removing the augered earth, a mixture of fluid, hydraulic-expansive cement grout is pumped through the central hollow shaft 13 of drill 11 into the bottom of the cavity until the cavity is filled to required depth, including filling all irregularities and voids within the wall of the cavity. The expansion-producing constituent of the grout mix may be one of those in a class of materials chemically reactant with water, including a mixture of high alumina cements with 5 to 30 percent gypsum, or other form of calcium sulfate, and 30 to 80 percent portland cement, or a mixture of calcium aluminate cements with 2 to 40 percent gypsum, or a mixture of calcium sulfoaluminate cements with 10 to 90 percent portland cement addition, or calcium aluminosulfate cements either with or without calcium sulfate.

With use of a grout mixture, which is a fluid, containing an after setting expansion-producing constituent, such as calcium sulfoaluminate cements, for example, the cast-in-place pile body 10 becomes set to the walls of the cavity in several hours with little, if any, expansion except that provided optionally by use of aluminum powder in the mix. The pile body 10, however, due to internal crystal growth during hydration of said expansion-producing constituents in the grout mix, continues to expand volumetrically throughout, after or beyond the point of final setting and while the grout hardens it expands to maximum expansive potential. Under such conditions it has been found that the crystal growth expansion effects can be controlled in a manner to be described later, and that the resultant expansion within the hardened grout mix body of the cast-in-place pile (see FIGURE 2) against the cavity wall, including portions formed in irregularities, voids, and pores in the cavity wall, causes increases in the load-bearing capacity of the pile 10 by about 45 percent over that which would be accomplished by using a corresponding grout mix without the after-setting expansion-producing constituent of the classes listed above. The load capacity, for some purposes, can be predetermined by adjusting the proportion of the after-setting expansion-producing constituent in the expansive cement grout mixture. By the same token, such piles can be fabricated to support loads which formerly required larger or longer cast-in-place piles formed by use of ordinary cement grout mixes.

It has been found that various combinations of the improved hydraulic cement grout referred to above with other expansion-producing compounds, such as aluminum powder, may enhance the properties of the fresh concrete with respect to offsetting the above mentioned "plastic-state" shrinkage.

Tables I and II below present the results accomplished by installing cast-in-place test piles in accordance with the above-described method. Table I presents the compositions of the fresh grout mixtures utilized for each test pile. Table II presents the exceptionally favorable results obtained through the use of the highly expansive grout mixtures, showing particularly the marked increases in load-bearing capacities with increased expansion of the pole bodies during the hardening cycle.

TABLE I.—FRESH GROUT MIXTURE DATA, COMPOSITION OF GROUT MIXTURES

| Pile No. | Sacks cementing solids per cu./yd. concrete | Ratio of water to cementing solids, gal. per sack | Proportions of expansion producing constituents in cementing solids, percent | Grout fluid-ifier percent of cementing materials (vehicle for aluminum powder), percent |
|---|---|---|---|---|
| 1 | 10.6 | 4.25 | None | 1 |
| 2 | 10.5 | 6.67 | ¹None | 0 |
| 3 | 11.3 | 6.50 | 13.6 | 0 |
| 4 | 10.6 | 4.25 | ¹None | 0 |
| 5 | 11.5 | 4.50 | 22.7 | 0 |
| 6 | 12.3 | 4.25 | 33.6 | 0 |

¹ Control.

Each pile was placed in strata of similar soil conditions; each pile was 12 inches in diameter and tests were conducted according to A.S.T.M. 1143–61T, as to time cycles. Control piles 1, 2, and 4, in which no expansive cement was used, were 21 feet long, and piles 4, 5, and 6 were 25 feet long. Piles 3, 5, and 6 were placed in the same general location and within about 20 feet of a control pile 1, 2, or 4.

TABLE II.—CONCRETE PILE DATA

| Pile No. | Free expansion for expansive cement grout mixture in laboratory control test, percent | Maximum test load, tons | Maximum settlement, inches | Net settlement after rebound, inches | Pile length, feet |
|---|---|---|---|---|---|
| 1 | None | 32 | 0.354 | 0.240 | 21 |
| 2 | None | 32 | 0.440 | 0.326 | 21 |
| 3 | 0.3 | 32 | 0.284 | 0.188 | 21 |
| 4 | None | 32 | 0.368 | 0.276 | 25 |
| 5 | 1.8 | 32 | 0.194 | 0.139 | 25 |
| 6 | 4.4 | 32 | 0.178 | 0.106 | 25 |

In Table II, the column designated "Free expansion for expansive-cement grout mixture in laboratory control test, percent" provides data from a laboratory test of the expansion potential for each of the corresponding grout mixtures specified in Table II. The values shown are determined directly by suitable measurements of linear expansion of prismatic specimens having dimensions of 10 inches in length and a cross-section of 2 inches by 2 inches. In these tests, cast specimens were stripped after eight hours and cured at 70° F.—100% relative humidity. Period measurements were utilized to determined maximum expansion as recorded in Table II. It is, however, well known in the art that no significant expansion results with specimens so made and tested, where the grout mixtures contain only portland cement, or portland cement and flyash, with or without inclusion of aluminum powder in the dosages referred to above. Compared with prior art methods, in which no expansion of the pile bodies took place during the concrete hardening cycle, it is demonstrated in "Net Settlement" column of Table II that with use of expansive-cement grout the expansion indicated in the "Proportions of expansion" column in Table I, occurring during the hardening cycle is controllable as to degree of free expansion, and that the observed values of free expansion reflect potential values of maximum settlement and post-test rebound. In other words, load-bearing capacities of piles made by the present method were significantly and controllably increased, due to the increased forces acting from within the set grout mix of the pile bodies, outwardly against the surrounding soil, correspondingly to increase the amount of skin friction produced between the surfaces of the piles and the adjacent soil.

It will be noted that test pile No. 1 included in the composition of the grout mixture, both flyash and a chemical composition, aluminum powder, to attain expansion before setting of the grout took place, the aluminum powder being used in order to offset at least some of the mechanical setting shrinkage which might otherwise lead to poorer quality of concrete.

From long experience in the testing of piles, and records over many years, it is possible to estimate the probable maximum load in terms of maximum settlement less than that which would probably result in failure when tested in accordance with ASTM 1143–61T. For example, for pile No. 6 (in Table II) with a maximum load of 32 tons, and maximum settlement of 0.178 inch, as compared with a maximum settlement of 0.368 inch and also with a maximum load of 32 tons for the control pile No. 4, made with a grout mixture without an expansion-producing constituent, calculations indicate that pile No. 6 could have been taken to 46 tons maximum load at about the same settlement figure as for pile No. 4.

A comparison of the data of Table II for piles 3, 5, and 6 shows that a relationship occurs between laboratory determined free expansion, for the same maximum load on the pile, that is, 32 tons, and net settlement after rebound in inches. These data for the three piles are plotted in FIGURE 15 wherein settlement in inches as the ordinate is plotted against percent free expansion of hardened grout as the abscissa. It is quite obvious that a range of between one and two percent free expansion of hardened grout specimens would be representative of expansive cement and grout mixtures useful in the design, and production of cast-in-place piles capable of load-bearing capacities 40 to 50 percent greater than can be obtained with use of the same grout mixtures minus the expansion-producing constituents.

Referring to FIGURE 3, there is illustrated an expansion-stressed cast-in-place pile 15 produced by the general method of the invention, to have a reinforcing cylindrical casing stressed therein for producing piles of greater strength, and where desired, having superior column action without necessarily increasing the size of the pile. For this purpose, a cavity 16 is provided in the earth situs by drilling the cavity and removing the drilled earth from the same in known manner. A perforated cylindrical casing 17 of suitable length is then supported within the cavity 16 and fluid-expansive-cement grout mix, which may include aluminum powder, is pumped or otherwise supplied within casing 17 with sufficient force to flow through the perforations in the casing, and thereby fill the cavity, including cavities both inside and outside of the casing. For very large diameter bodies, probably of short length, perforations may be omitted and the grout may be placed by known means in the annulus between the casing and the cavity.

As before, hydration of the expansive-cement constituents causes crystal growth and expansion phenomena within the grout body while the same is hardening, and both the fresh and hardening grout will expand into irregularities, voids, and pores of the cavity wall with resultant improved load-bearing capacity. In addition, the hardened grout will have expanded to greater or lesser degree in all directions and with particular effect against the highly resisting inner and outer surfaces of the casing, thereby to place the casing in a stressed condition.

FIGURES 4 and 5 illustrate two similarly expanded concrete piles 18 and 19, respectively, which have been cast in place by the method described in connection with FIGURE 3, except that instead of including a reinforcing casing of steel or other metal, reinforcing rods 20 or 21 of the same or varying lengths are dropped in the cavity at appropriate times to be in somewhat staggered but substantially uniformly distributed relation within the grout as the grout mix is progressively placed within the cavity. As before, the hardening cement grout body will expand against the cavity wall and the rods 19 will acquire a stressed condition, and thereby serve as a restraining mechanism limiting expansion at longitudinally unconfined portions of the cement grout body. Such rods may be provided with anchorage such as end plates or discs to augment bonding of concrete to steel to provide greater restraint.

FIGURES 6 and 7 illustrate a variation of the method described in connection with FIGURES 4 and 5, by which the reinforcing elements of the cast-in-place pile 14a include pipes 22, 22 and rods 23, 23, the pipes also serving a double purpose of reinforcing the pile and of being used for progressively supplying the fluid, expansive-cement grout mix to the cavity. In other words, the pipes, as well as the rods, are left in the grout body to serve as stressed reinforcing and restraining mechanisms therein. The pipes also may be fitted with various forms or shapes of end anchorage.

FIGURES 8 and 9 illustrate other cast-in-place concrete structures produced in situ by the methods exemplified as described in connection with FIGURES 1 to 7, including in FIGURE 8 a stressed concrete tunnel lining or like conduit 24 having stressed rods 25, 25 extending longitudinally therein, or a canal lining 26 either with or without stressed reinforcing rods, as shown in FIGURE 9, or two-way, mesh-reinforcing means 26a. In each instance, temporarily fixed but removable forms, indicated at 35 and 36 in FIGURES 8 and 9, respectively, are provided to form and retain the expanded bodies until they are significantly and adequately hardened.

FIGURE 10 shows a vertical cross-section through an existing concrete-retaining wall 27, dam, or like structure built in or upon an earth situs, in which damage due to corrosion, errosion, or blast, has occured to produce a cavity 28 in the wall. To repair the damage, a temporary form or bulkhead 28 is fixed and braced in place as indicated at 37 and 38, and fluid, expansive-cement grout is pumped into the enclosed cavity 28, through a conduit 29. As before, the grout first sets and then substantially hardens, while continuing to expand into the surrounding walls of the situs and thereby set up compressive stress in the concrete. For relatively large cavities, a grid or cage of reinforcing bars, which may be provided with anchorages, may be included before placing the expansive-cement grout. Upon removal of the temporary form 28, the hardened concrete filler 30 will for the most part be stronger and more durable than the original wall structure.

FIGURES 11 and 12 illustrate a modification of the improved method to repair a cavity 39 in a concrete wall 40 caused by errosion, or the like, for a condition similar to that shown in FIGURE 10, but utilizing a plurality of closed, somewhat porous bags 41, 41, or varying bag means. The bags 41 may be successively stacked within the errosion cavity 39, and likewise progressively inflated with the aforesaid expansive-cement grout supplied through suitable conduit means. Likewise, the stacked bags may be placed within and/or about reinforcement cages. For example, each bag 41 may contain a two-way, openwork restraining member 42, such as wire mesh or the like, positioned to be adjacent the outwardly exposed wall portions of the porous bags to serve as a restraining mechanism after the cement grout sets, and during the hardening cycle of the cement mix within the bags the restraining mechanism 42 tends to concentrate the expansion-developed forces inwardly within the hardening cement bodies to provide stronger bonding and frictional contact of the bags, through the previously oozed out grout, with the corresponding wall areas of the cavity 39 and portions of the adjacent bags. That is, the restraining mechanisms 42 can be utilized to control both the amount and the direction of the forces created by hydration of the expansive-cement constituents during the cement hardening cycles of the respective bags. That is, the directions and degrees of restraints will influence both the magnitudes of expansions in various directions and the corresponding magnitudes of induced stresses. This procedure provides a good fluid seal between the expanded bag means and the wall of the situs, and eliminates the need for installation of temporary braced casing or forms of the type shown at 37 in FIGURE 10.

FIGURES 13 and 14 illustrate use of the method described above with reference to FIGURES 11 and 12, for lining a drainage canal 45 in situ. Relatively flat bags 46, 46 are positioned in collapsed condition, or in partially collapsed condition, due to internal cage reinforcement around the channel cavity 47 provided in the earth situs. Curved mesh, wire-restraining members 48, for example, may be supported within the bags to be in spaced relation to the cavity surface 47, and then expansive-cement grout is successively pumped into the somewhat porous bags to expand the same substantially to the condition best shown in FIGURE 13, after which the pumped grout sets and hardens. As before, during the hardening cycle, the restraining mechanisms 48 direct the forces created through expansion inwardly within the hardening cement mix body, to bond the previously exuded grout outside the bags to the cavity surfaces, and thereby substantially to improve the fluid seal between the hardening concrete outside of the bags and the adjacent wall portions of the channel cavity 47, including irregularities, crevices, and voids in the surfaces of the same.

In any or all of the foregoing examples of methods utilizing expansive-cement constituents for effecting stressing of the cement mix bodies by controlled expansion during the respective concrete hardening cycles, it is contemplated that the ultimate expansion may be more effective if aluminum powder is added to the initial cement mix, to compensate for any tendency toward mechanical or setting shrinkage during the setting cycle, which might otherwise reduce the quality of the eventually hardened body.

Thus has been provided an improved method for forming variously shaped, stressed concrete piles and other bodies in an earth situs to have high load-bearing capacity not heretofore attainable in such piles or bodies.

Other modifications of the invention may be resorted to without departing from the spirit thereof or the scope of the appended claims.

What is claimed is:

1. A method of producing a cast-in-place concrete structure in a situs, comprising the steps of: confining at the situs, in opposition to a restraining wall area thereof, a quantity of fluid grout mixture containing an after-setting, expansion-producing constituent capable of developing predetermined substantial volumetric expansion after the grout mixture sets, countered substantially by restraint in diverse directions, and hardens; allowing the confined, initially fluid grout mixture to set and harden as a unitary body including portions thereof conforming to said wall area; said expansive-cement grout mixture effecting a volumetric expansive growth of the resultant grout body after it has so set and continues hardening and strength gain with a corresponding increase in normal pressure and frictional resistance applied by the expanded, ultimately hardened body against said wall area and with the setting up of generally compressive stresses throughout the hardened grout body in diverse directions; said steps including suspending a restraining mechanism within the fluid grout mixture to become embedded in the body upon said setting of the grout mixture; said restraining mechanism during subsequent hardening of the body thereby serving to direct expansion-developed forces created by said after-setting, expansion-producing constituent in opposition to said wall area; said restraining mechanism having diversely disposed portions for correspondingly restraining said volumetric expansion; said confinement of the fluid grout mixture being accomplished by pumping the same into flexible bag means positioned at the situs, progressively to expand the bag means, and said restraining mechanism being contained within the bag means.

2. A method as in claim 1, said bag means being of porous fabric through which a small fraction of the fluid grout oozes when the bag means is expanded by the grout mixture.

3. A method of producing a cast-in-place concrete structure in situ, comprising the steps of: confining within a hollow matrix for the structure defined by opposing wall areas of the situs, a quantity of fluid cement grout mixture containing an after-setting, expansion-producing constituent capable of developing predetermined substantial volumetric expansion after the grout mixture sets, countered substantially by restraint of said opposing wall areas in diverse directions, and then hardens; allowing the confined, initially fluid grout mixture to set and then harden as a unitary solid body including portions thereof conforming to the shape of the matrix; said expansive-cement grout mixture effecting a volumetric expansive growth of the resultantly formed grout body after it has so set and continues hardening and strength gain with a corresponding increase in normal pressure and frictional resistance applied by the expanded, ultimately hardened body against said opposing wall areas of the matrix and with the setting up of generally compressive stresses throughout the hardened grout body in diverse directions; said steps including suspending a restraining mechanism within the fluid grout mixture to become embedded in the formed body upon said setting of the grout mixture; said restraining mechanism providing portions diversely disposed in opposition said wall areas, and thereby during the after-setting hardening of the formed body serving to direct expansion-developed forces created by the after-setting, expansion-producing constituent correspondingly restrain said after-setting volumetric expansion between said diversely disposed portions and opposing wall areas.

4. A method as in claim 3, said expansion-producing constituent of the fluid grout mix being within a class of materials chemically reactant with water, including: a mixture of high alumina cements with 5 to 30 percent gypsum or other form of calcium sulfate, and 30 to 80 percent Portland cement; or a mixture of calium aluminate cements with 2 to 40 percent gypsum; or a mixture of calcium sulfoaluminate cements with 10 to 90 percent portland cement addition; or calcium aluminosulfate cements with or without calcium sulfate.

5. A method as set forth in claim 3, wherein said expansion-producing constituent effects expansion during said hardening of the body by crystal growth therein during hydration of the expansion-producing constituent in the fluid grout mixture.

6. A method as in claim 3, wherein said confinement of the fluid grout mixture is accomplished at least in part by pumping the grout mixture into flexible bag means positioned at the situs to expand the bag means.

7. A method as in claim 3, wherein said confinement of the fluid grout mixture is accomplished at least in part by pumping the grout mixture into flexible bag means positioned at the situs, to expand the bag means; said bag means being porous fabric through which a relatively small fraction of the fluid mortar oozes when the bag means is expanded.

8. A method as in claim 3, for making a cast-in-place pile and in which said hollow matrix is an augered pile cavity in an earth situs, and wherein a restraining mechanism is positioned in the cavity to become embedded in the concrete body upon setting of the grout; said restraining mechanism during subsequent hardening of the body thereby serving to direct expansion-developed forces created by said after-setting, expansion-producing constituent in opposition to the wall of the augered pile cavity.

9. A method as in claim 3, for making a cast-in-place pile and in which said hollow matrix is an augered pile cavity in an earth situs, and wherein a restraining mechanism is positioned in the cavity to become embedded in the concrete body upon setting of the grout; said restraining mechanism during subsequent hardening of the body thereby serving to direct expansion-developed forces created by said after-setting, expansion-producing constituent in opposition to the wall of the augered pile cavity; said restraining mechanism including a rigid cylindrical member generally centered in the cavity, and provided with a multiplicity of apertures through which said confined fluid mortar flows.

10. A method as in claim 3, for making a cast-in-place pile and in which said wall area is that of an augered pile cavity in an earth situs, and wherein a restraining mechanism is positioned in the cavity to become embedded in the grout body upon setting of the grout; said restraining mechanism including a plurality of elongated rigid elements variously positioned in the grout mixture prior to the same attaining a substantially set condition.

11. A method as in claim 3, for making a cast-in-place pile and in which said hollow matrix is that of an augered pile cavity in an earth situs, and wherein the restraining mechanism is positioned in the cavity to become embedded in the grout body upon setting of the grout; said restraining mechanism during subsequent hardening of the body thereby serving to direct expansion-developed forces created by said after-setting, expansion-producing constituent in opposition to the wall of the augered pile cavity; said restraining mechanism including a plurality of elongated rigid elements variously positioned in the grout body prior to the same attaining a substantially set condition and at least one of said rigid elements being conduit means for supplying the fluid grout mixture to said pile cavity.

12. A method as in claim 3, wherein said fluid grout mixture includes aluminum powder to enhance the properties of the fresh concrete with respect to offsetting plastic state shrinkage.

References Cited

UNITED STATES PATENTS

| 3,099,911 | 8/1963 | Turzillo | 61—35 |
| 3,290,840 | 12/1966 | Middendorf | 52—232 |
| 3,359,742 | 12/1967 | Blatter | 61—39 |

FOREIGN PATENTS 647,581  12/1950  Great Britain.

OTHER REFERENCES

Properties of an Expansion Cement for Chemical Prestressing, Klein et al., American Concrete Inst. Journal, July 1961, pp. 59–80, volume 58.

JACOB SHAPIRO, Primary Examiner

U.S. Cl. X.R.

52—232; 61—7, 45, 50, 51, 53.52, 56; 264—32